United States Patent
Loukili et al.

(10) Patent No.: US 11,832,551 B2
(45) Date of Patent: Dec. 5, 2023

(54) AGRICULTURAL SPRAYER PERFORMANCE CONTROL SYSTEM

(71) Applicant: Deere & Company, Moline, IL (US)

(72) Inventors: Tarik Loukili, Johnston, IA (US); Brandon Wellman, Bondurant, IA (US)

(73) Assignee: Deere & Company, Moline, IL (US)

( * ) Notice: Subject to any disclaimer, the term of this patent is extended or adjusted under 35 U.S.C. 154(b) by 778 days.

(21) Appl. No.: 16/670,588

(22) Filed: Oct. 31, 2019

(65) Prior Publication Data
US 2021/0127567 A1    May 6, 2021

(51) Int. Cl.
| | |
|---|---|
| A01C 23/04 | (2006.01) |
| A01C 23/00 | (2006.01) |
| B05B 1/20 | (2006.01) |
| B05B 12/00 | (2018.01) |
| B05B 12/08 | (2006.01) |
| A01M 7/00 | (2006.01) |
| B05B 12/12 | (2006.01) |

(52) U.S. Cl.
CPC .......... *A01C 23/007* (2013.01); *A01C 23/047* (2013.01); *A01M 7/0042* (2013.01); *A01M 7/0089* (2013.01); *B05B 1/20* (2013.01); *B05B 12/004* (2013.01); *B05B 12/082* (2013.01); *B05B 12/126* (2013.01)

(58) Field of Classification Search
CPC .. A01C 23/007; A01C 23/047; A01M 7/0089; A01M 7/0042; B05B 12/126; B05B 12/082; B05B 12/084
See application file for complete search history.

(56) References Cited

U.S. PATENT DOCUMENTS

| | | | |
|---|---|---|---|
| 2006/0265106 A1* | 11/2006 | Giles | A01B 79/005 700/283 |
| 2011/0153168 A1 | 6/2011 | Peterson et al. | |
| 2013/0311050 A1* | 11/2013 | Cash | A01B 79/005 701/50 |
| 2018/0325012 A1 | 11/2018 | Ferrari et al. | |
| 2019/0000003 A1 | 1/2019 | Brooks | |
| 2019/0150357 A1* | 5/2019 | Wu | G06T 7/73 |
| 2019/0374966 A1* | 12/2019 | Thompson | B05B 13/041 |

FOREIGN PATENT DOCUMENTS

WO    WO2018090492 A1    5/2018

OTHER PUBLICATIONS

European Search Report issued in counterpart application No. 20198470.5 dated Mar. 5, 2021 (08 pages).

* cited by examiner

*Primary Examiner* — Tuongminh N Pham
(74) *Attorney, Agent, or Firm* — Christopher J. Volkmann; Kelly, Holt & Christenson PLLC

(57) ABSTRACT

An agricultural sprayer includes a spray boom supported by a frame, a spraying system comprising a set of spray nozzles spaced along the spray boom, and a control system configured to control the spraying system to spray a liquid based on a target application to an agricultural field, generate a spray performance metric indicative of performance of the spraying system relative to the target application, and generate a control signal to control the agricultural sprayer based on the spray performance metric.

20 Claims, 15 Drawing Sheets

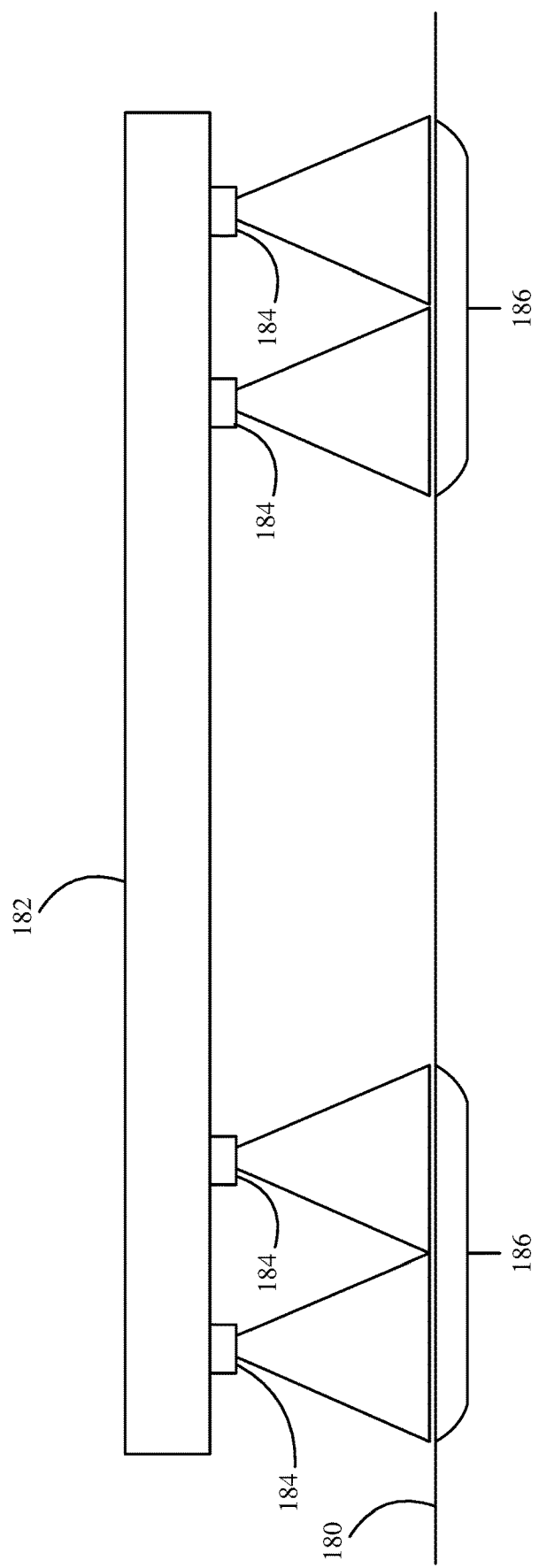

AGRICULTURAL SPRAYER PERFORMANCE CONTROL SYSTEM

FIELD OF THE DESCRIPTION

The present description generally relates to agricultural machines. More specifically, but not by limitation, the present description relates to a control system for an agricultural sprayer that controls operation (e.g., velocity) of the sprayer based on a spray performance metric indicative of performance of the spraying system relative to a target application.

BACKGROUND

There are many different types of agricultural machines. One such machine is an agricultural sprayer. An agricultural spraying system often includes a tank or reservoir that holds a substance to be sprayed on an agricultural field. Such systems typically include a fluid line or conduit mounted on a foldable, hinged, or retractable and extendible boom. The fluid line is coupled to one or more spray nozzles mounted along the boom. Each spray nozzle is configured to receive the fluid and direct atomized fluid to a crop or field during application. As the sprayer travels through the field, the boom is moved to a deployed position and the substance is pumped from the tank or reservoir, through the nozzles, so that it is sprayed or applied to the field over which the sprayer is traveling.

The discussion above is merely provided for general background information and is not intended to be used as an aid in determining the scope of the claimed subject matter.

SUMMARY

An agricultural sprayer includes a spray boom supported by a frame, a spraying system comprising a set of spray nozzles spaced along the spray boom, and a control system configured to control the spraying system to spray a liquid based on a target application to an agricultural field, generate a spray performance metric indicative of performance of the spraying system relative to the target application, and generate a control signal to control the agricultural sprayer based on the spray performance metric.

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIGS. 3A and 3B (collectively referred to as FIG. 3) are schematic illustrations of boom movement during an example operation of an agricultural sprayer.

DETAILED DESCRIPTION

Figure 1:
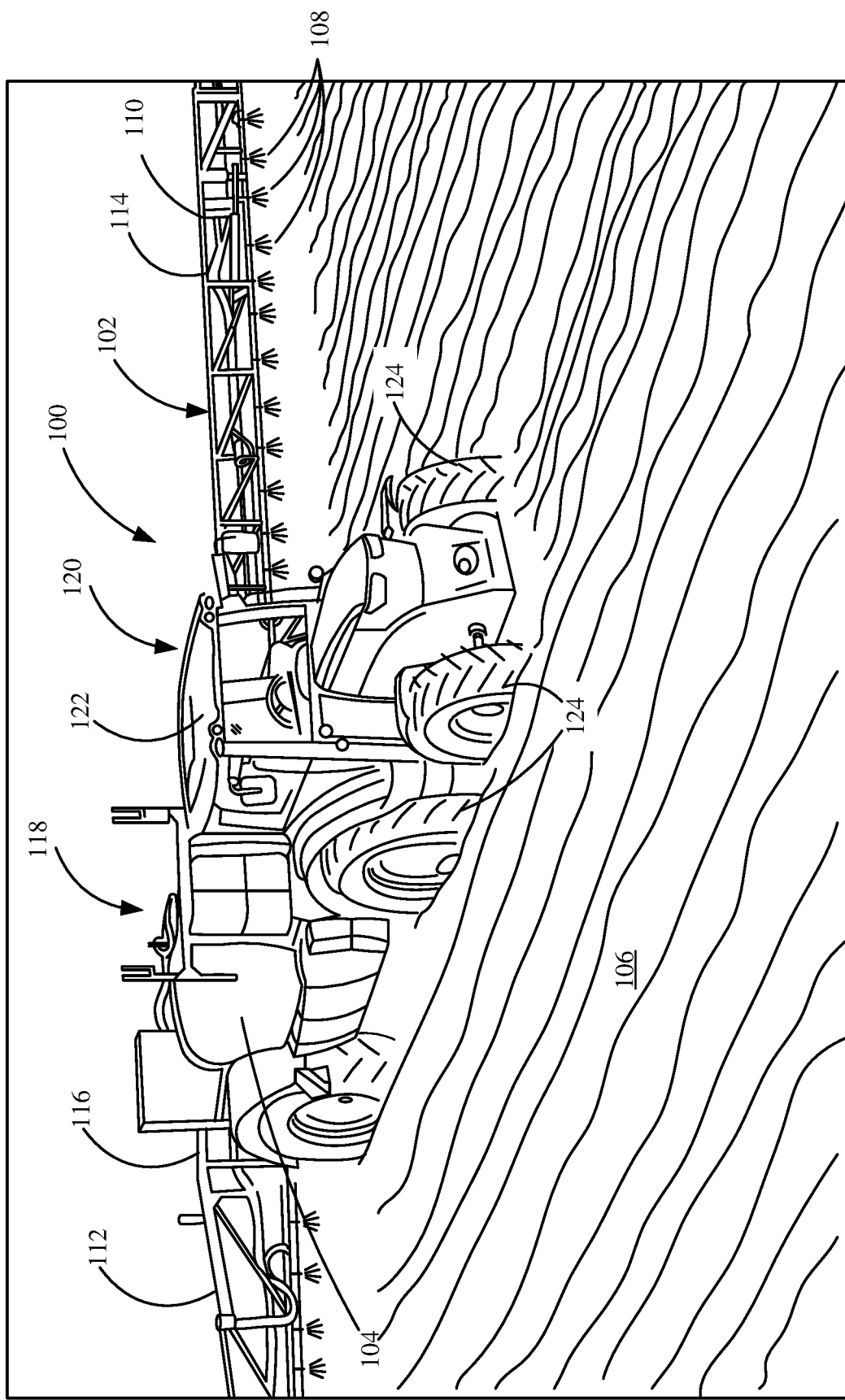
FIG. 1 illustrates an example agricultural sprayer.

The present description generally relates to agricultural machines. More specifically, but not by limitation, the present description relates to a control system for an agricultural sprayer that controls operation (e.g., velocity) of the sprayer based on a spray performance metric indicative of performance of the spraying system relative to a target application.

As an agricultural spraying machine or agricultural sprayer traverses a field, it applies a spray of a liquid (e.g., fertilizer, fungicides, or other chemicals) using nozzles mounted on beams, often referred to as booms. The booms on many agricultural sprayers have dynamics of a flexible beam, that is, any two points on the boom may have different measure distances between them during applied loading conditions, e.g., caused by external forces and/or the sprayer dynamics. Furthermore, such booms are often underactuated. That is, the boom has more degrees of freedom or movement than actuators to control the boom. In either case, the boom is susceptible to vibration or other undesired movements.

The spraying system, which typically includes a pump that pumps the liquid from a reservoir to nozzles mounted on the boom, is controlled to deliver a target or prescribed application to the agricultural field. For example, in precision spraying applications, the sprayer is controlled to deliver the liquid to a precise dispersal area, such as directly on a plant (crop or weed), in between plants, or otherwise, at a particular rate so that a target quantity of the liquid is applied to the dispersal area. Accordingly, precise application of the liquid is important in these applications, as deviations can result in the liquid being applied to other areas or in incorrect amounts. For example, if fertilizer is unevenly applied, it is wasted in areas of over-application, and areas of under-application can experience reduced yields.

For sake of illustration, the primary axis of the boom of the sprayer is perpendicular to the machine's intended direction of motion across a field, and has multiple nozzles that spray liquid chemical onto the field. As the sprayer traverses across the field, disturbances such as changes in wheel height due to ground level changes, impact with objects (such as rocks, trees, etc.), and/or wind can induce vibration in the boom, which can have undesirable effects on the boom position and orientation, and adversely effect the spraying performance. For example, the disturbances can change the vertical position of the nozzles, and thus the distance of the nozzles to the dispersal area in the field. Further, the disturbances can affect fore-aft and/or lateral or side-to-side motion of the boom. For instance, when turning the machine, centrifugal force can cause lateral movement of the boom, and thus the nozzles mounted on the boom. Some or all of these affects can be exacerbated with increasing machine velocity across the field.

The present disclosure provides a control system that control the agricultural machine based on a spray performance metric indicative of performance of the spraying system relative to a target application. In one example, a velocity control of the sprayer facilitates reductions in boom vibrations, which increases spray performance to within a target performance threshold. By minimizing or otherwise reducing the boom vibrations, performance of the agricultural spraying machine is improved.

FIG. 1 illustrates an agricultural spraying machine (or agricultural sprayer) 100. Sprayer 100 includes a spraying system 102 having a tank 104 containing a liquid that is to be applied to field 106. Tank 104 is fluidically coupled to spray nozzles 108 by a delivery system comprising a set of conduits. A fluid pump is configured to pump the liquid from tank 104 through the conduits through nozzles 108. Spray nozzles 108 are coupled to, and spaced apart along, boom 110. Boom 110 includes arms 112 and 114 which can articulate or pivot relative to a center frame 116. Thus, arms 112 and 114 are movable between a storage or transport position and an extended or deployed position (shown in FIG. 1).

In the example illustrated in FIG. 1, sprayer 100 comprises a towed implement 118 that carries the spraying system, and is towed by a towing or support machine 120 (illustratively a tractor) having an operator compartment or cab 122. Sprayer 100 includes a set of traction elements, such as wheels 124. The traction elements can also be tracks, or other traction elements as well. It is noted that in other examples, sprayer 100 is self-propelled. That is, rather than being towed by a towing machine, the machine that carries the spraying system also includes propulsion and steering systems.

Figure 2:
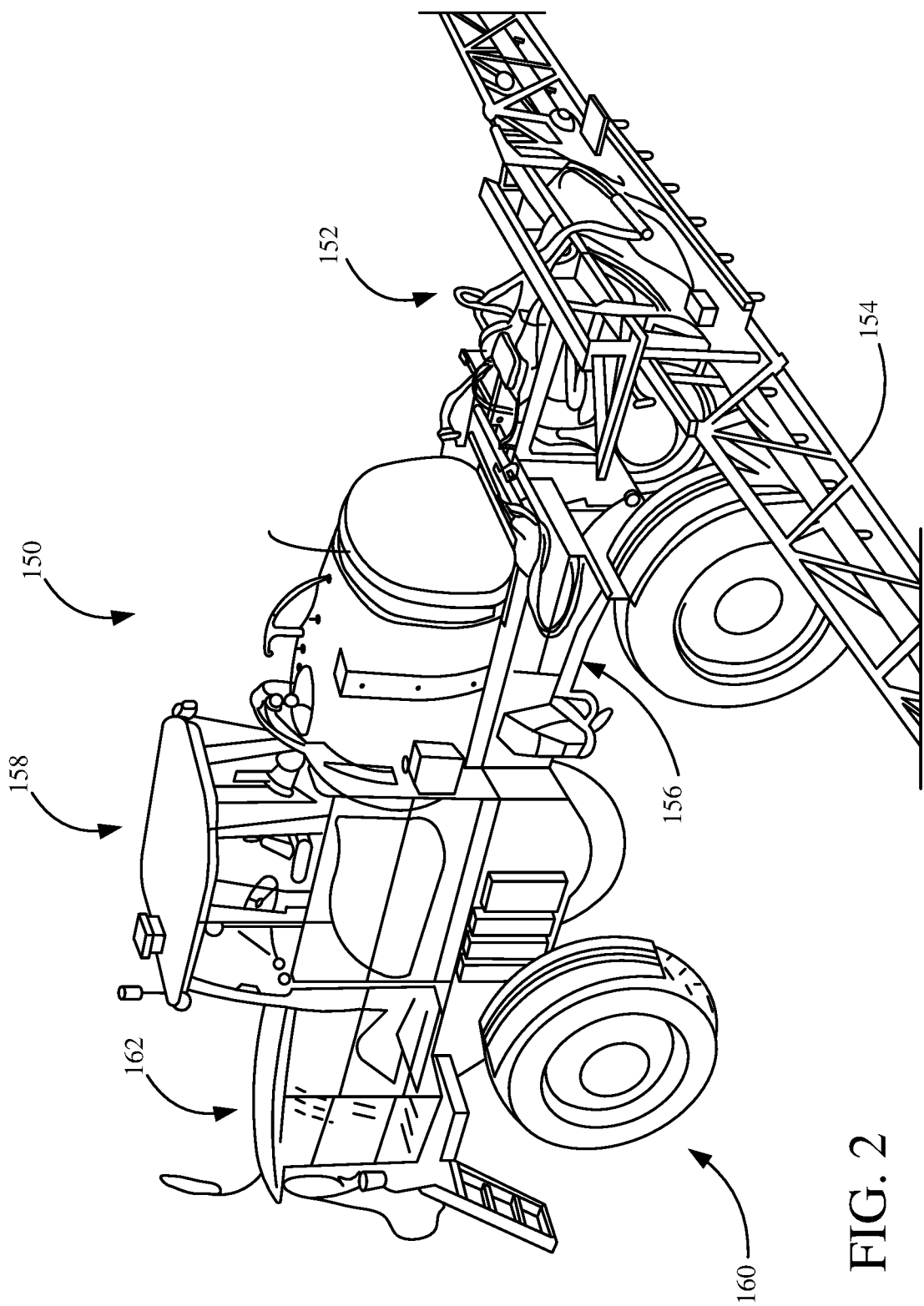
FIG. 2 illustrates an example agricultural sprayer.

FIG. 2 illustrates one example of an agricultural sprayer 150 that is self-propelled. That is, sprayer 150 has an on-board spraying system 152, that is carried on a machine frame 156 having an operator compartment 158, a steering system 160 (e.g., wheels or other traction elements), and a propulsion system 162 (e.g., internal combustion engine).

Figure 3B:
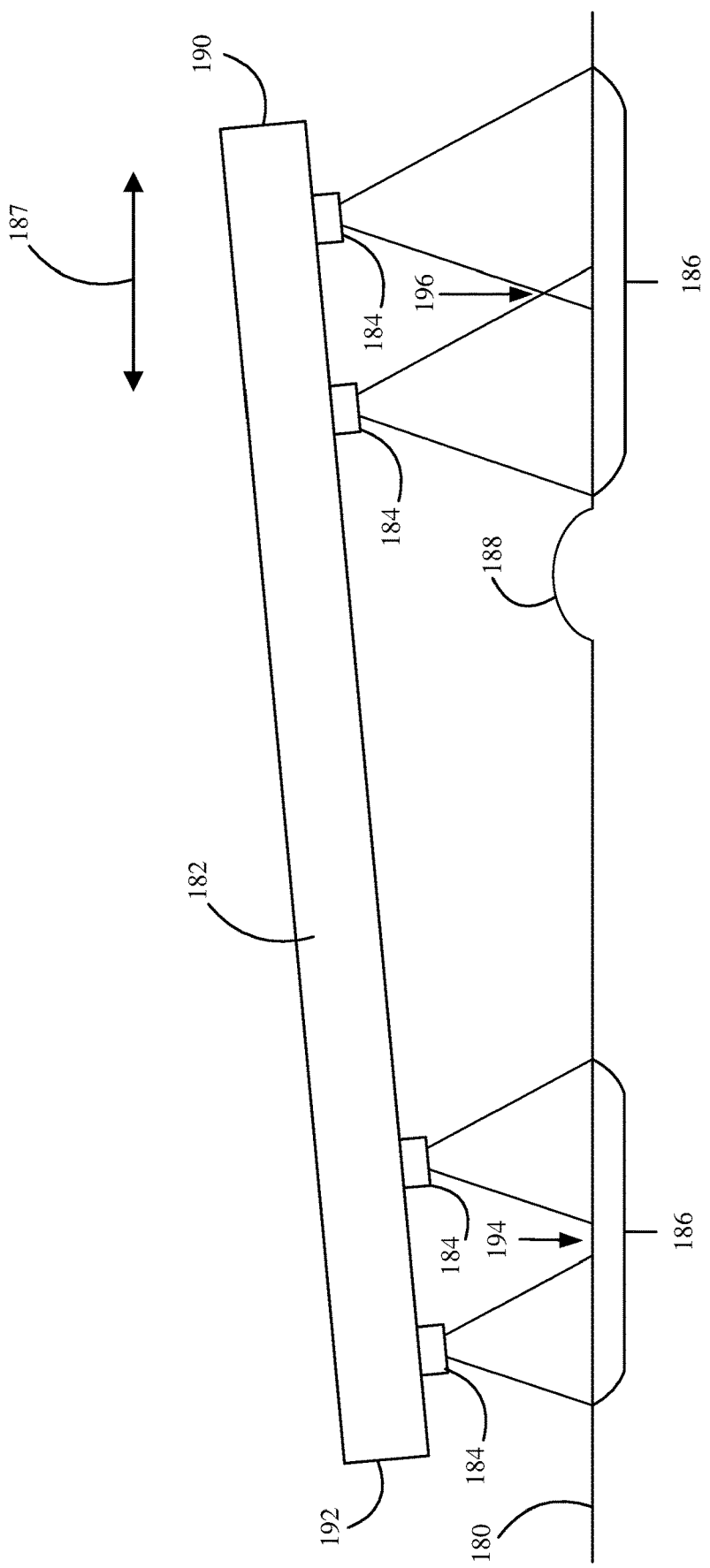

FIGS. 3A and 3B (collectively referred to as FIG. 3) are schematic illustrations of boom movement during operation of an agricultural sprayer (such as sprayers 100,150). Generally, as the machine traverses on field surface 180, the boom 182 has an equilibrium state that is generally horizontal, or at least substantially parallel to the plane of surface 180. Thus, in this state, each spray nozzle 184 (only four spray nozzles are illustrated in FIG. 3A, but the sprayer can have more or less nozzles) are a similar distance to the field surface 180. The spraying system is configured to pump the liquid to nozzles 184 at a rate that will result in a desired application to the dispersal area, generally represented at 186, based on this distance of nozzles 184. In other words, this configuration provides a target or prescribed amount of liquid chemical to the dispersal area 186.

As noted above, disturbances can affect fore-aft motion of the boom 182 (into and out of the page in FIG. 3B), as well as lateral, side-to-side, motion of the boom 182 (represented by arrow 187), both of which can result in poor spraying performance. As shown in FIG. 3B, disturbances can result in vibrations or other movement of boom 182 that change the position and velocity of boom 182 and/or nozzles 184 relative to the dispersal area 186, thus changing the spray pattern relative to the dispersal area 186. For example, as noted above, boom 182 is able to flex, to some extent, due to the effects of these disturbances, which can comprise any of a number of factors. For example, gravity can cause boom 182 to flex. Also, the ground engaging elements (wheels or tracks) carrying boom 182 can contact a change in field height or an obstacle such as a rock (generally represented at 188), which causes one end 190 of boom 182 to rise and/or the boom to flex. The opposite end 192 of boom 182 may have a corresponding movement in opposite direction (toward surface 180 in FIG. 3B). The disturbances can be caused by other things as well. For instance, external forces on boom 182, such as ground impacts, wind, etc., can also induce vibration in boom 182.

In any case, the performance of the spraying system is affected by these disturbances. As shown in FIG. 3B, due to the disturbances, areas of under-spray 194 and over-spray 196 can occur, which causes the spray performance to deviate from a target application. In FIG. 3A, an example target or prescribed application defines the particular area 186 in the field to receive the liquid chemical. Again, as noted above, this can be on a particular plant, in between plants, etc. In addition, the target application can define a rate or volume of the liquid chemical to the applied in this target area. As discussed in further detail below, a spray performance metric indicates the performance of the spraying system in meeting this target application. Illustratively, if the actual area that is sprayed (and actual rate or volume of the spray) meets the target (or is within some allowable tolerance), the performance is considered to be maximal. The metric can be generated on any suitable scale. In one example, this includes a scale of zero to one hundred percent. Of course, the spray performance metric can be generated in any of a number of ways.

In one example, the spray performance metric is generated based on sensor inputs that sense the spray from the nozzle. An example spray sensor comprises an imaging sensor that captures images that are processed to detect the spray pattern between the nozzles and the ground. In one example, an optical sensor captures images of the spray pattern. In another example, a spray sensor senses electromagnetic radiation (e.g., radio frequency (RF) transmissions, thermal imaging) used to view a change on the agricultural surface or crop upon receiving an applied liquid spray.

For example, a thermal imaging system can detect a thermal change within images. This can include detecting a thermal change with respect to plants, soil, etc. For example, when a sprayed substance comes into contact with agricultural material, the material will undergo a thermal change resulting from the sprayed substance contacting the material. Therefore, based on the thermal change in the images, the system can detect the sprayed area to which the spray was applied. Also, an optical sensor with a light emitting diode (or other radiation source) in a radiation detector can be used.

Alternatively, or in addition, the spray performance metric can be inferred based on the boom position and movements. The boom position and movements can be determined based on sensor signals from sensors positioned on, or otherwise associated with, boom 182. For instance, the sensors can comprise height sensors (e.g., optical sensors, etc.) that detect a height of a portion of boom 182 from the ground surface 180. Alternatively, or in addition, the sensors include accelerometers, gyroscopes, inertial measurement units (IMUs), to name a few.

In one example, higher boom vibrations or other movements are correlated to lower spray performance scores, and more stable boom positions (e.g., less boom vibration) are correlated to higher spray performance metrics.

Figure 4:
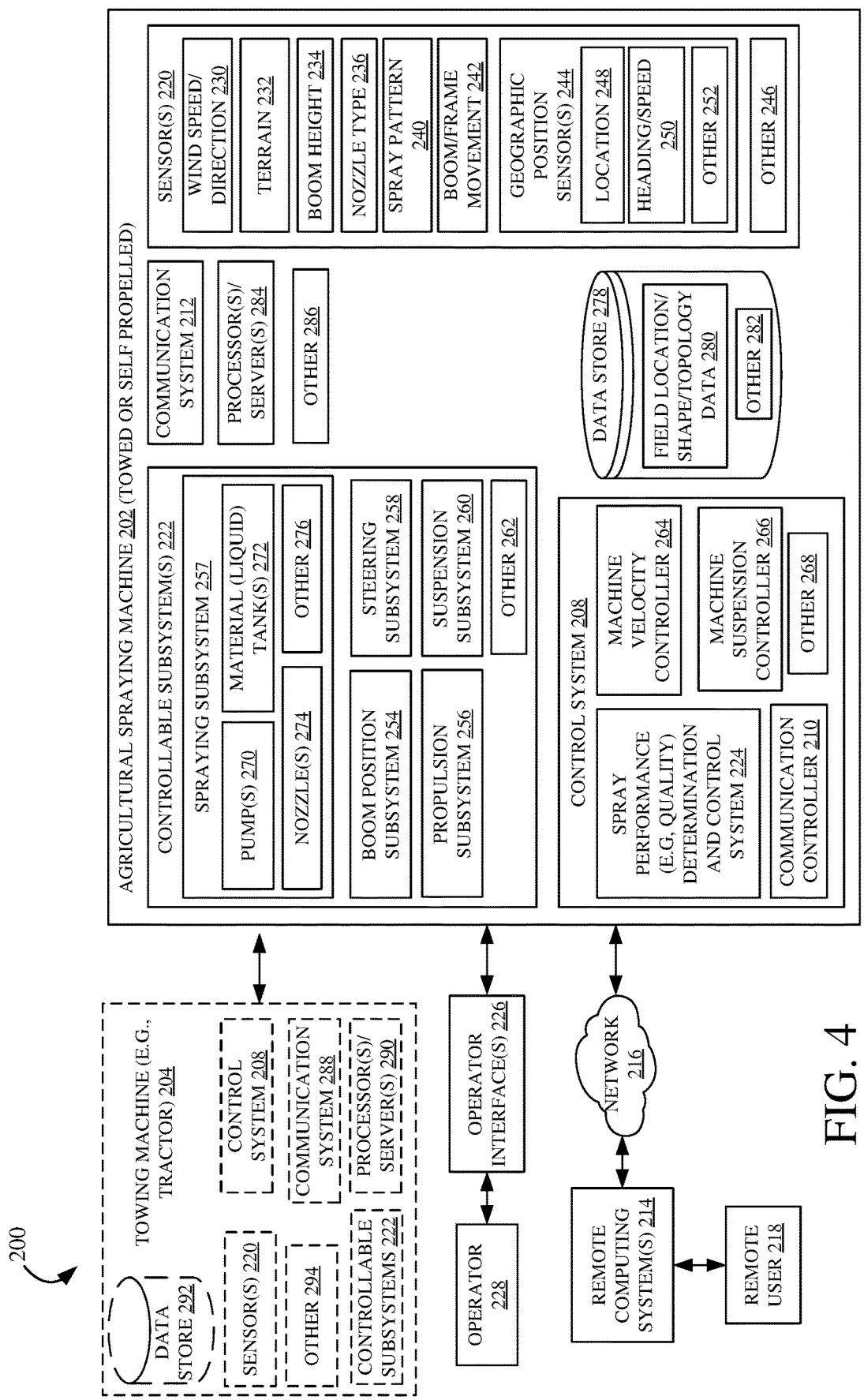
FIG. 4 is a block diagram of one example of an agricultural spraying machine architecture.

FIG. 4 illustrates one example of an agricultural spraying machine architecture 200 having an agricultural spraying machine 202 configured to perform a spraying operation on an agricultural field. Examples of agricultural spraying machine 202 include, but are not limited to, sprayers 100 and 150 illustrated in FIGS. 1 and 2. Accordingly, machine 202 can comprise a towed implement or it can be self-propelled. FIG. 4 illustrates this with dashed box 204 representing a towing machine, such as a tractor that is coupled to machine 202 through one or more links 206 (electrical, mechanical, pneumatic, etc.).

Machine 202 includes a control system 208 configured to control other components and systems of machine 202. For instance, control system 208 includes a communication controller 210 configured to control communication system 212 to communicate between components of machine 202 and/or with other systems, such as remote computing system 214 over a network 216. Network 216 can be any of a wide variety of different types of networks such as the Internet, a cellular network a local area network, a near field communication network, or any of a wide variety of other networks or combinations of networks or communication systems.

A remote user 218 is shown interacting with remote computing system 214. Remote computing system 214 can be a wide variety of different types of systems. For example, remote system 214 can be a remote server environment, remote computing system that is used by remote user 218. Further, it can be a remote computing system, such as a mobile device, remote network, or a wide variety of other remote systems. Remote system 216 can include one or more processors or servers, a data store, and it can include other items as well.

Communication system 212 can include wireless communication logic, which can be substantially any wireless communication system that can be used by the systems and components of machine 202 to communicate information to other items, such as between computing system 208, sensors 220, controllable subsystems 222, and spray performance determination and control system 224. In one example, communication system 212 communicates over a controller area network (CAN) bus (or another network, such as an Ethernet network, etc.) to communicate information between those items. This information can include the various sensor signals and output signals generated by the sensor variables and/or sensed variables.

Control system 208 is configured to control interfaces, such as operator interface(s) 226 that include input mechanisms configured to receive input from an operator 228 and output mechanisms that render outputs to operator 228. The user input mechanisms can include mechanisms such as hardware buttons, switches, joysticks, keyboards, etc., as well as virtual mechanisms or actuators such as a virtual keyboard or actuators displayed on a touch sensitive screen. The output mechanisms can include display screens, speakers, etc.

Sensors 220 can include any of a number of different types of sensors. In the illustrated example, sensors 220 include wind speed and/or direction sensors 230, terrain sensors 232, boom height sensors 234, nozzle type sensors 236, spray pattern sensors 240, boom and/or frame movement sensors 242, geographic position sensors 244, and can include other sensors 246 as well.

Sensor(s) 230 are configured to sense a wind speed and/or direction on the field during operation of machine 202. Terrain sensor(s) 232 are configured to sense characteristics of the field over which machine 202 is traveling. For instance, sensor(s) 232 can detect the topography of the field to determine the degree of slope of various areas of the field, detect a boundary of the field, detect obstacles or other objects on the field (such as rocks, trees, etc.), among other things. Sensors 234 are configured to sense the height of the boom of machine 202 at one or more positions along the boom. For example, a number of boom height sensors 234 can be located at locations extending along the length of the boom. The sensors can comprise any suitable type of sensors, such as optical sensors, RADAR, SONAR, etc. Sensor(s) 236 are configured to detect a nozzle type of the nozzles on the boom and sensors 240 are configured to sense the spray from the nozzles. Sensors 240 can comprise any suitable type of sensors including, but not limited to, optical sensors, thermal sensors, radio frequency sensors, etc.

In one example, one or more of sensors 232 and 240 comprise an imaging system having image capture components configured to capture images and image processing components configured to process those images. In one example, image capture components include a stereo camera configured to capture video of the field being operated upon. An example stereo camera captures high definition video at 30 frames per second (FPS) with one 110 degree wide-angle field of view. Of course, this is for sake of example only.

Sensor(s) 242 are configured to sense movement of the boom. The sensors can be mounted on the boom, mounted on the frame that the boom is coupled to, or positioned otherwise. The sensors can include any suitable type of sensors including, but not limited to, accelerometers, gyroscopes, IMUs, to name a few.

Geographic position sensor(s) 244 include location sensor(s) 248, heading/speed sensor(s) 250, and can include other sensors 252 as well. Location sensor(s) 248 are configured to determine a geographic position of the machine 202 on the field. Location sensor(s) 248 can include, but are not limited to, a Global Navigation Satellite System (GNSS) receiver that receives signals from a GNSS satellite transmitter. It can also include a Real-Time Kinematic (RTK) component that is configured to enhance the precision of position data derived from the GNSS signal.

Sensors 250 are configured to determine a speed at which machine 202 is traversing the field during the spraying operation. This can include sensors that sense the movement of ground-engaging elements (e.g., wheels or tracks) and/or can utilize signals received from other sources, such as location sensor(s) 248.

Controllable subsystems 222 illustratively include a boom position subsystem 254, a spraying subsystem 257, a propulsion subsystem 256, a steering subsystem 258, a suspension subsystem 260, and can include other subsystems 262 as well. Boom position subsystem 254 is configured to move the boom from a storage or transport position to a deployed position. In one example, it includes actuators that are coupled to the boom and pivot the boom relative to a center or main frame.

Propulsion subsystem 256 is configured to propel machine 202 across the field. It can include a power source, such as an internal combustion engine, and a set of ground-engaging traction elements, such as wheels or tracks. A steering subsystem 258 configured to control the heading of the machine, by steering the ground-engaging elements. Suspension subsystem 260 is coupled to and supports the machine relative to the ground-engaging traction elements.

Suspension subsystem 260 can include shock absorbers, springs, and other linkages that connects machine 202 to the ground-engaging elements.

As illustrated in FIG. 4, control system 208 includes a machine velocity controller 264 configured to control the velocity of machine 202 by generating control signals for propulsion subsystem 256. Control system 208 also includes a machine suspension controller 266 configured to control suspension subsystem 260. In one example, controller 266 comprises a closed-loop control system that controls settings of subsystem 260 to reduce the magnitude of instantaneous acceleration at one or more points of interest (e.g., camera, spray nozzles, etc.). Control system 208 can include other items 268 as well. Spraying subsystem 257 includes one or more pumps 270 configured to pump material from tanks 272 through conduits to nozzles 274 mounted on the boom. Spraying subsystem 257 can include other items 276 as well.

Machine 202 includes a data store 278 configured to store data for use by machine 202, such as field data 280. Examples include field location data that identifies a location of the field to be operated upon by machine 202, field shape information that identifies a shape of the field, and field topology data that defines the topology of the field. Data store 278 can store other items 282 as well.

Machine 202 is also illustrated as including one or more processors or servers 284, and can include other items 286 as well.

As also illustrated in FIG. 4, where a towing machine 204 tows agricultural spraying machine 202, towing machine 204 can include some of the components discussed above with respect to machine 202. For instance, towing machine 204 can include some or all of sensors 220, component(s) of control system 208, and some or all of controllable subsystems 222. Also, towing machine 204 can include a communication system 288 configured to communicate with communication system 212, one or more processors or servers 290, a data store 292, and can include other items 294 as well.

Figure 5:
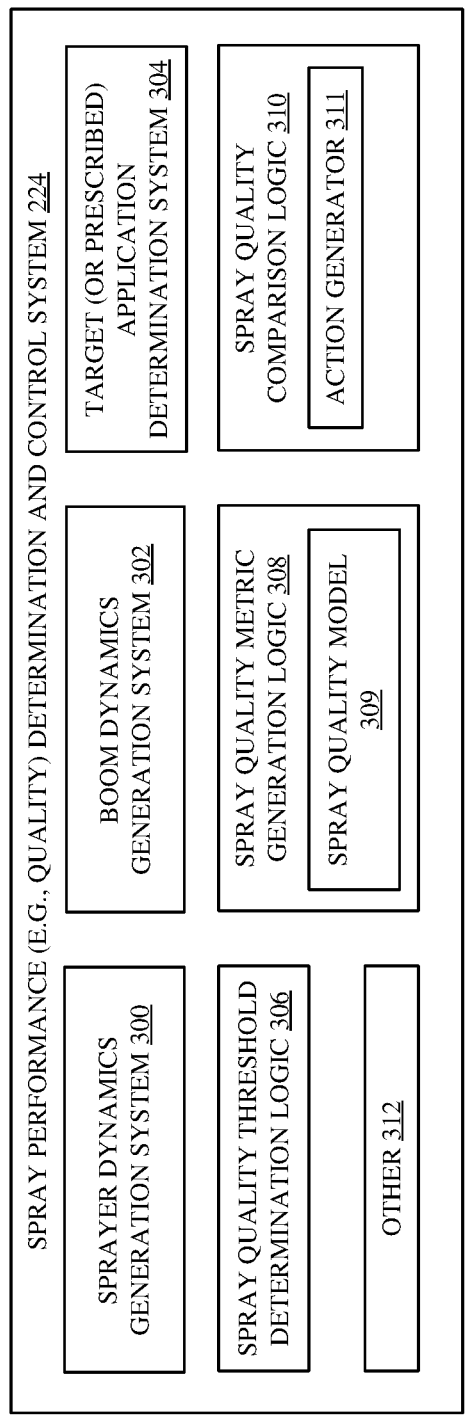
FIG. 5 is a block diagram of one example of a spray performance determination and control system.

FIG. 5 is a block diagram illustrating one example of spray performance determination and control system 224. System 224 is configured to determine a performance characteristic, such as the spray quality, of spraying subsystem 257 relative to a target or prescribed application. In this case, the quality represents the deviation from the target area and/or volume.

System 224 includes a sprayer dynamics generation system 300, a boom dynamics generation system 302, a target or prescribed application determination system 304, spray quality threshold determination logic 306, spray quality metric generation logic 308, spray quality comparison logic 310, and can include other items 312 as well. System 300 is configured to generate sprayer dynamics which represents the structural components and their corresponding motion or equilibrium under the action of one or more input forces. System 300 can generate a model that models these dynamics, including input forces, properties, or other characteristics that cause or stimulate changes to the components of machine 202.

Figure 6:
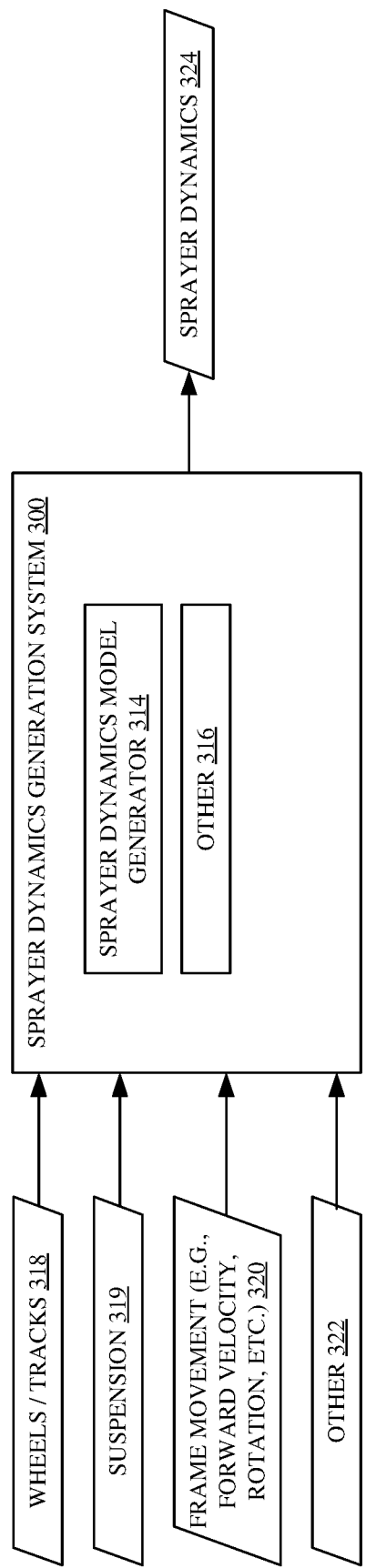
FIG. 6 is a block diagram of one example of a sprayer dynamics generation system.

FIG. 6 is a block diagram illustrating one example of system 300. System 300 includes a sprayer dynamics model generator 314, and can include other items 316 as well. Generator 314 receives inputs representing ground-engaging elements (wheels and/or tracks) 318, suspension system 319, frame movement 320, and can receive other inputs 322 as well. Inputs 318 and 319 model the dynamic response of the wheels and suspension, respectively, in response to external forces, such as impact with a rock, change in ground height, downward force caused by movement of the sprayer frame, etc.

Input 320 represents movement of the frame of the sprayer. This can indicate a forward velocity of machine 202, a rotation of the frame of machine 202, such as a left-right oscillation that is perpendicular to the forward direction of travel. System 300 generates sprayer dynamics 324.

Figure 7:
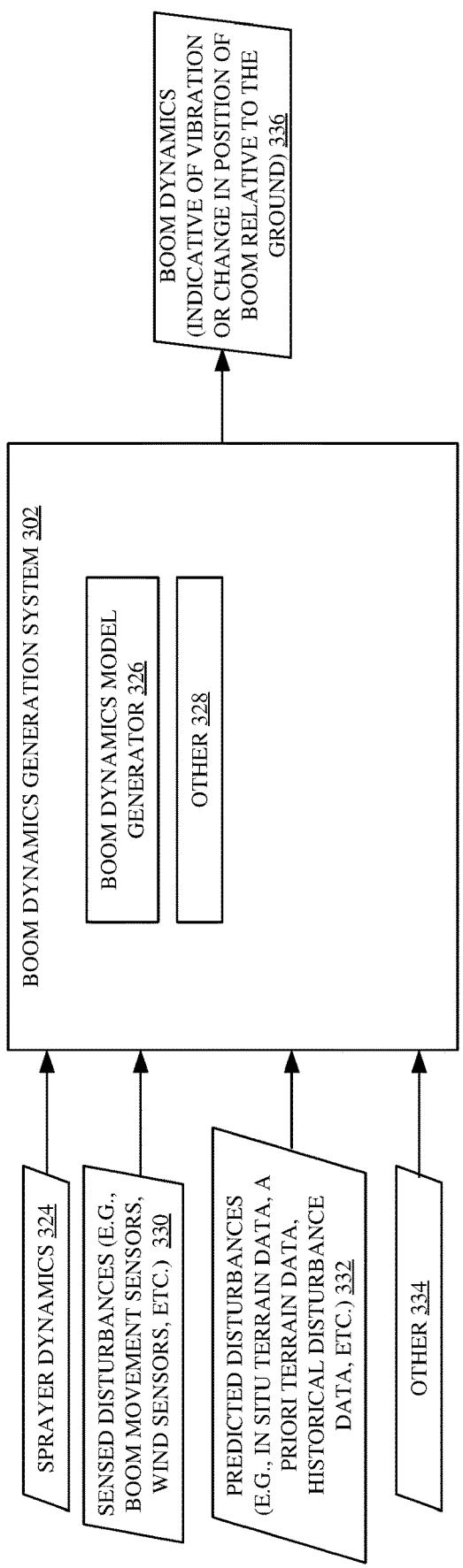
FIG. 7 is a block diagram of one example of a boom dynamics generation system.

FIG. 7 is a block diagram illustrating one example of system 302. System 302 includes a boom dynamics model generator 326, and can include other items 328 as well.

Generator 326 receives sprayer dynamics 324, generated by system 300. Also, generator 326 receives an input 330 indicating sensed disturbances of the boom, an input 332 indicative of predicted disturbances of the boom, and can receive other inputs 334 as well.

Input 330 indicates sensed disturbances, such as sensor inputs from boom movement sensors, wind sensors, etc. The sensed disturbances are indicative of forces that have already been exposed to machine 202 to impart vibration or other undesired boom movement.

Input 332 is indicative of predicted disturbances such as, but not limited to, in situ terrain data and/or a priori terrain data. In situ data includes data that represents observed conditions or characteristics of machine 202. For example, in situ includes data that is obtained from sensors 220 on machine 202, and is indicative of machine speed, heading, vibration, or other sprayer dynamics. A priori data includes data representing conditions or characteristics of the terrain ahead of machine 202, but not yet observed or sensed by machine 202. For example, a priori data can be obtained from another machine (such as an unmanned aerial vehicle (UAV) or drone) that senses characteristics of the field prior to field traversal by machine 202. This terrain data can indicate such things as changes in topography or objects, such as rocks, trees, or other obstacles.

In another example, input 332 can be based on historical disturbance data indicating disturbances experienced from other machines during prior operations on the field. For instance, during a planting operation, a prior spraying application, etc., machine disturbances can be sensed and stored in data store 278. This data can be used to predict disturbances that affect boom dynamics 336 generated by generator 326. Boom dynamics 336 indicate the vibration or change in position of the position relative to the ground. From this information, the height or change in height of the nozzles positioned along the boom can be determined, to obtain an indication of spray performance (e.g., whether the nozzles are over spraying, under spraying, etc.).

Figure 8:
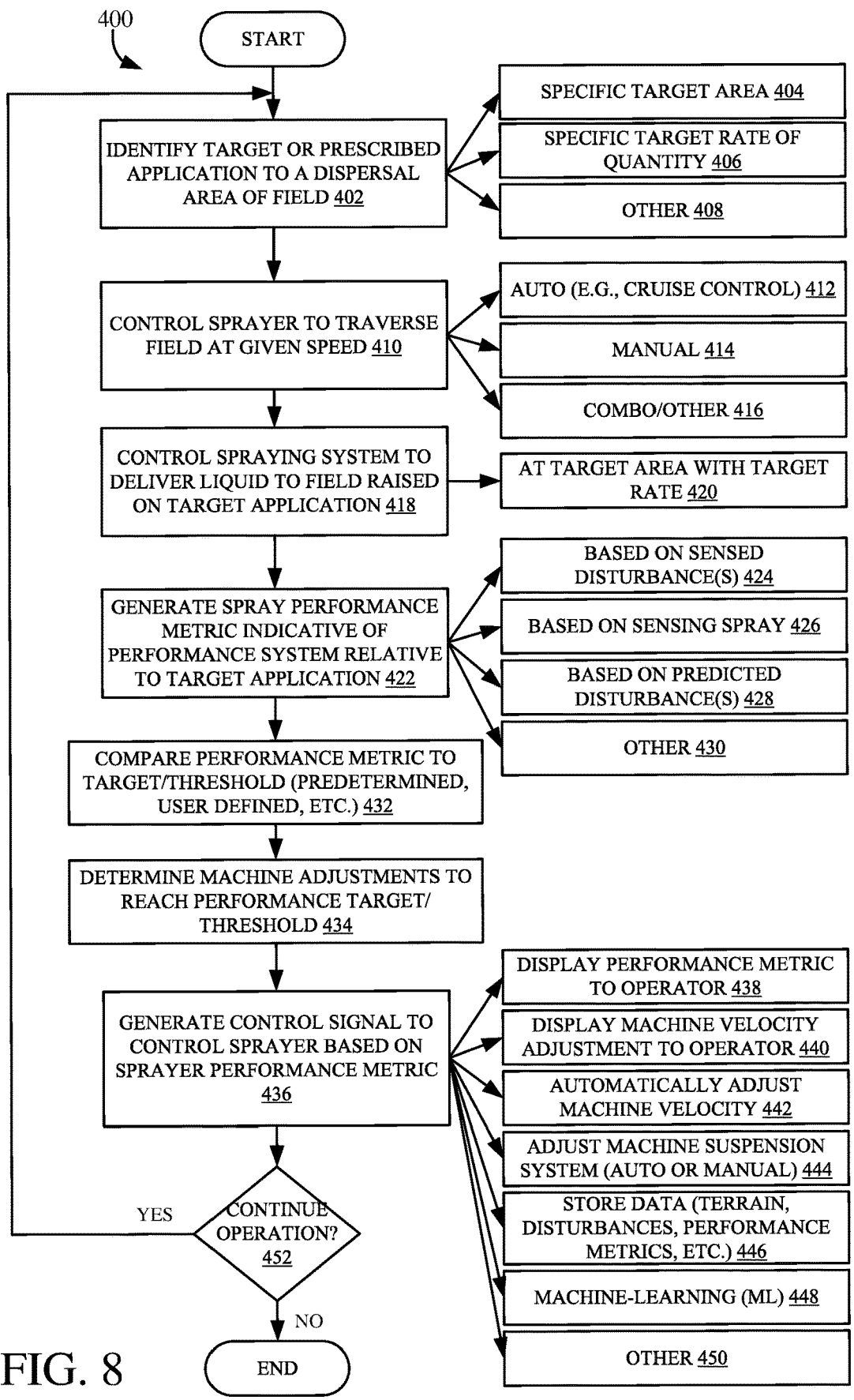
FIG. 8 is a flow diagram illustrating one example of controlling an agricultural spraying machine based on a spray performance metric.

FIG. 8 is a flow diagram 400 illustrating one example of controlling an agricultural spraying machine based on a spray performance metric. For sake of illustration, but not by limitation, FIG. 8 will be described in the context of architecture 200 illustrated in FIG. 4.

At block 402, a target or prescribed application to a dispersal area of the agricultural field is identified. This can be done in any of a number of ways. For instance, operator 228 can provide inputs through operator interfaces 226 which define the target application in terms of the specific target area (block 404), the specific target rate or quantity of the liquid (block 406) or it can be defined in other ways (block 406). In another example, a prescribed application is received from remote computing system 214 and is stored in data store 278 for access by system 224 in controlling machine 202. In another example, the target application can be determined dynamically during operation of machine 202, such as based on sensor inputs that detect the presence of crops, weeds, or other plant to be sprayed. For instance, imaging sensors can detect the presence of these plants in a path ahead of machine 202.

At block 410, spraying machine 202 is controlled to traverse the field at a given speed. This can be done automatically by machine velocity controller 264 controlling propulsion subsystem 256. For instance, an operator can specify a desired speed (e.g., 30 miles per hour (MPH)) through operator interfaces 226. Based on this input, control system 208 controls machine 202 to maintain the set cruising speed over the field.

The sprayer can be controlled by manual inputs by operator 228 through operator interfaces 226. This is represented by block 414. For example, an operator can actuate pedals, levers, or other input mechanisms to accelerate or decelerate the machine 202. The sprayer can be controlled based on a combination automatic and manual controls. This is represented by block 416.

At block 418, spraying subsystem 257 is controlled to deliver the liquid to the field based on the target application identified at block 402. In the illustrated example, this includes control system 208 controlling spraying subsystem 257 so that the liquid is applied to the target area with the target rate to obtain a desired coverage.

At block 422, a spray performance metric indicative of performance of the spraying system relative to the prescribed application is generated. It is noted that this performance metric can be indicative of the current performance of the machine as it is spraying the target area or a predicted performance of the spraying system for the target area as machine 202 approaches that target area.

The spray performance metric can be generated based on sensed disturbances (block 424), based on sensing the spray (block 426), based on predicted disturbances (block 428), or based on other parameters (block 430).

In one example of block 424, sensor signals are received from one or more of wind speed/direction sensors 230, and boom/frame movement sensors 242. This input indicates a variety of different forces that impart disturbances on the boom.

In one example of block 426, sensor signals are received from sensors 240 based on sensing the spray pattern from the nozzles and/or sensing the terrain after the spray has been applied to detect the area covered by the spray.

In one example of block 428, inputs are received from one or more of wind speed/direction sensors 230, terrain sensors 232, sensors 234, and boom/frame movement sensors 242 to indicate a predicted disturbance of the boom as it approaches or is at the target area.

At block 432, the performance metric is compared to a performance target or threshold, which can be pre-defined, user-defined, or defined in other ways. For sake of example, assume the performance threshold at block 432 indicates a spray performance metric of at least eighty percent. Further assume that the spray performance metric generated at block 422 indicates an actual or predicted performance of seventy percent. Here, block 432 indicates that the performance of spraying subsystem 257 is to be increased by at least ten percent.

At block 434, machine adjustments to reach the performance target are determined. At block 436, a control signal to control spraying machine 202 is generated based on the spray performance metric. The control signal can control spraying machine 202 (or other components in systems or architecture 200) in any of a number of ways. For example, the control signal can control operator interfaces 226 to render (on a display and/or audibly) an indication of the performance metric to operator 228. This is represented by block 438. Alternative, or in addition, the control signal can control operator interfaces 226 to render (on a display and/or audibly) a velocity adjustment. This is represented by block 440. Also, the control signal can automatically adjust the machine velocity using machine velocity controller 264 to control propulsion subsystem 256.

In one example, the control signal can control suspension subsystem 260 using machine suspension controller 266. This is represented by block 444. This suspension adjustment can closed-loop feedback to reduce the magnitude of instantaneous acceleration at one or more points of interest (e.g., camera, spray nozzles, etc.). This can be done automatically and/or based on input from operator 228.

The control signal can also control architecture 200 to store data in data store 278 and/or in remote computing system 214. For instance, this data can indicate the terrain encountered by machine 202, disturbances encountered by machine 202, the performance metrics correlated to the field locations, or any other data. Of course, the control signal can control architecture 200 in other ways as well. This is represented by block 450.

At block 452, if the spraying operation is continued, operation returns to block 402 for subsequent dispersal areas on the field.

Figure 9:
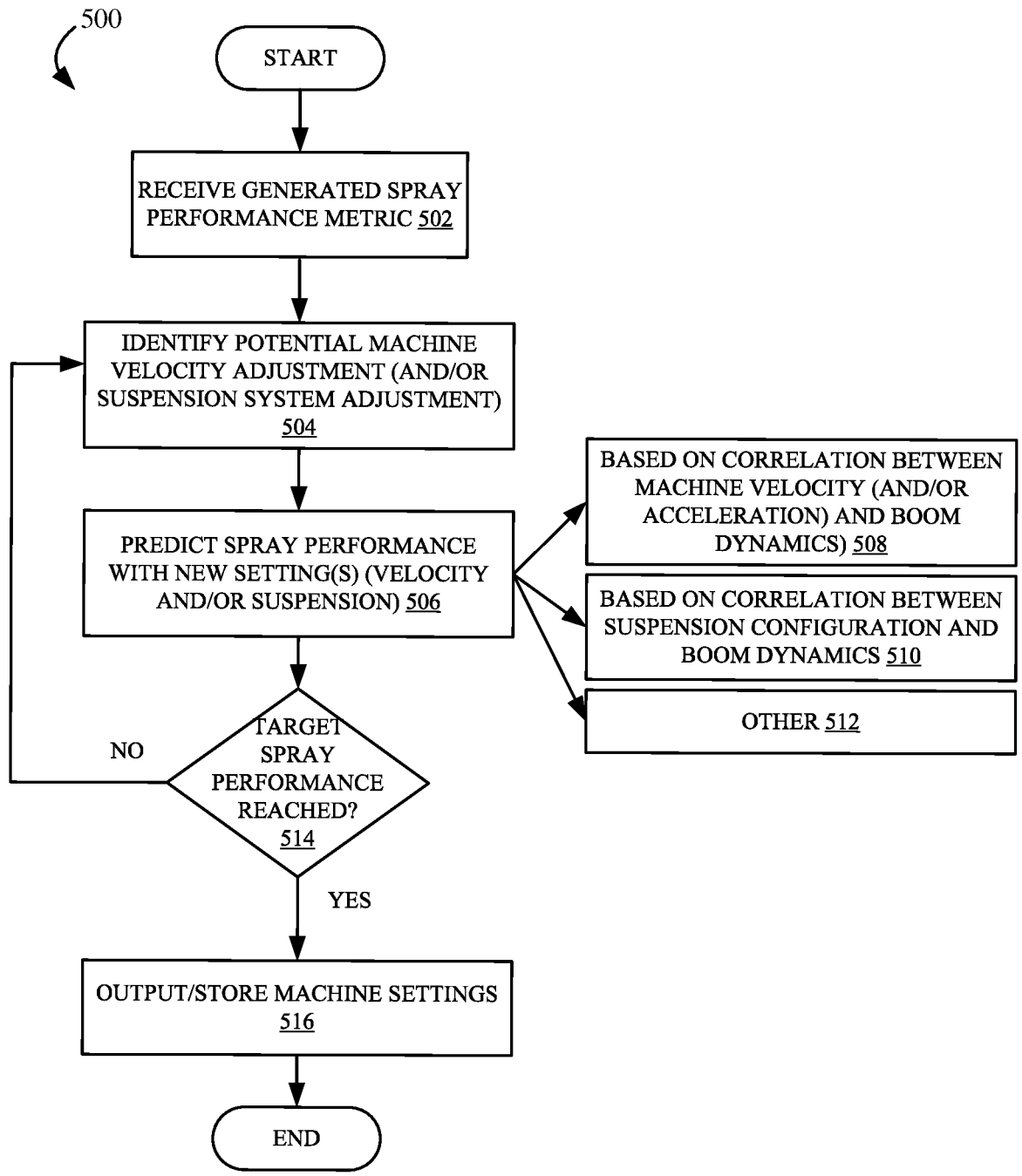
FIG. 9 is a flow diagram illustrating one example of determining machine adjustments to reach a performance target.

FIG. 9 is a flow diagram 500 illustrating one example of determining machine adjustments to reach a performance target or threshold. For sake of illustration, but not by limitation, FIG. 9 will be described in the context of block 434 illustrated in FIG. 8 and architecture 200 illustrated in FIG. 4.

At block 502, a spray performance metric is received. In the illustrated example, the metric is generated at block 422 and is indicative of performance of spraying subsystem 257 relative to a target application.

For sake of illustration, assume the performance spray metric received at block 502 indicates a seventy percent performance of spraying subsystem 257. This can be based on, for example, spraying subsystem 257 spraying seventy percent of the target area, spraying the target area with seventy percent of the liquid volume, etc.

At block 504, a potential machine velocity adjustment is identified. Alternatively, or in addition, the adjustment can include a suspension system adjustment, such as that described above. In the context of the example discussed above, assume the potential machine velocity adjustment identified at block 504 includes a two MPH reduction in the machine velocity.

At block 506, a predicted spray performance with the new velocity settings, identified at block 504, is predicted. Of course, this can also include a predicted spray performance with a potential suspension adjustment, or a combination of velocity and suspension adjustments.

In one example of block 506, a correlation between the machine velocity and/or acceleration on the boom dynamics is determined. Based on this correlation, the spray performance is predicted. This is represented by block 508. For example, based on the change in velocity modeled by sprayer dynamics 324, system 302 determines the corresponding boom dynamics 336, which indicate the vibration of the boom at the velocity corresponding to the potential new velocity setting.

When suspension adjustments are utilized, block 506 can include determining a correlation between the suspension setting configuration and the boom dynamics. This is represented by block 510. Of course, the spray performance can be predicted in other ways as well. This is represented by block 512.

At block 514, system 224 determines whether the target spray performance has been reached. In one example, block 514 is satisfied when the spray performance is equal to or approximately the same as the target spray performance. Here, for sake of illustration, it may be that the target spray performance is reached with the greatest machine velocity to reduce the overall time it takes to complete the spraying operation. Of course, the determination as to whether the spray performance is reached at block 514 can be done in other ways as well. for instance, block 514 is satisfied only when the target performance metric is exceeded by a threshold amount (e.g., at least five percent greater, etc.). Of course, this is for sake of example only.

At block 516, the machine setting that corresponds to the satisfying the target spray performance at block 514, are output. For instance, the machine settings can be output to control system 208 for control of controllable subsystems 222, can be output to remote computing system 214 or accessed by remote user 218 and/or remote storage, and/or it can be stored in data store 278.

It can thus be seen that the present system provides a number of advantages. For example, but not by limitation, the present control system determines the effect of boom vibration on spray performance and generates corresponding control signal(s) to control the machine. For instance, a target machine velocity is determined to achieve a target spray quality, taking into account sprayer and boom dynamics. The target machine velocity is used to control the machine, such as, but not limited to, automatic speed changes. For sake of illustration, a steering input to turn the sprayer in a particular direction (left or right) can induce fore-aft motion of the boom. The control system generates control outputs to control (automatically and/or through manual control) the sprayer to turn in an opposite direction at a particular time and/or with a particular magnitude/duration to mitigate the fore-aft motion.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors, processing systems, controllers and/or servers. In one example, these can include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands. Alternatively, or in addition, input devices are configured to detect gesture commands to control the machine.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 10:
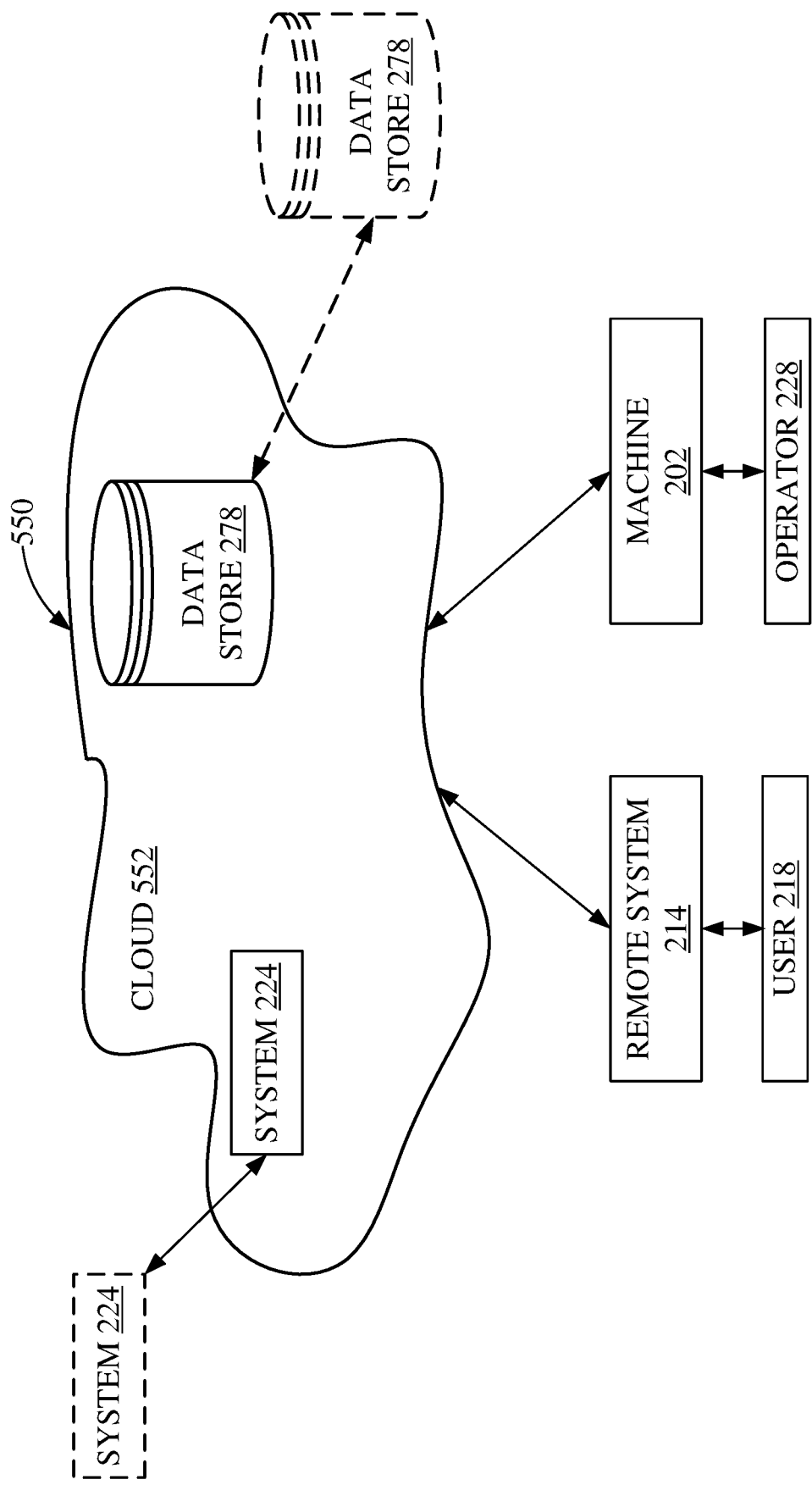
FIG. 10 is a block diagram showing one example of the architecture illustrated in FIG. 4, deployed in a remote server architecture.

FIG. 10 is a block diagram of one example of the agricultural spraying machine architecture, shown in FIG. 4, where agricultural machine 202 communicates with elements in a remote server architecture 550. In an example, remote server architecture 550 can provide computation, software, data access, and storage services that do not require end-user knowledge of the physical location or configuration of the system that delivers the services. In various examples, remote servers can deliver the services over a wide area network, such as the internet, using appropriate protocols. For instance, remote servers can deliver applications over a wide area network and they can be accessed through a web browser or any other computing component. Software or components shown in FIG. 4 as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

In the example shown in FIG. 10, some items are similar to those shown in FIG. 4 and they are similarly numbered. FIG. 10 specifically shows that system 224 and data store 278 can be located at a remote server location 552. Therefore, agricultural machine 202 accesses those systems through remote server location 552.

FIG. 10 also depicts another example of a remote server architecture. FIG. 10 shows that it is also contemplated that some elements of FIG. 4 are disposed at remote server location 552 while others are not. By way of example, data store 278 can be disposed at a location separate from location 552, and accessed through the remote server at location 552. Alternatively, or in addition, system 224 can be disposed at location(s) separate from location 552, and accessed through the remote server at location 552.

Regardless of where they are located, they can be accessed directly by agricultural machine 202, through a network (either a wide area network or a local area network), they can be hosted at a remote site by a service, or they can be provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers. In such an example, where cell coverage is poor or nonexistent, another mobile machine (such as a fuel truck) can have an automated information collection system. As the agricultural machine comes close to the fuel truck for fueling, the system automatically collects the information from the machine or transfers information to the machine using any type of ad-hoc wireless connection. The collected information can then be forwarded to the main network as the fuel truck reaches a location where there is cellular coverage (or other wireless coverage). For instance, the fuel truck may enter a covered location when traveling to fuel other machines or when at a main fuel storage location. All of these architectures are contemplated herein. Further, the information can be stored on the agricultural machine until the agricultural machine enters a covered location. The agricultural machine, itself, can then send and receive the information to/from the main network.

It will also be noted that the elements of FIG. 4, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 11:
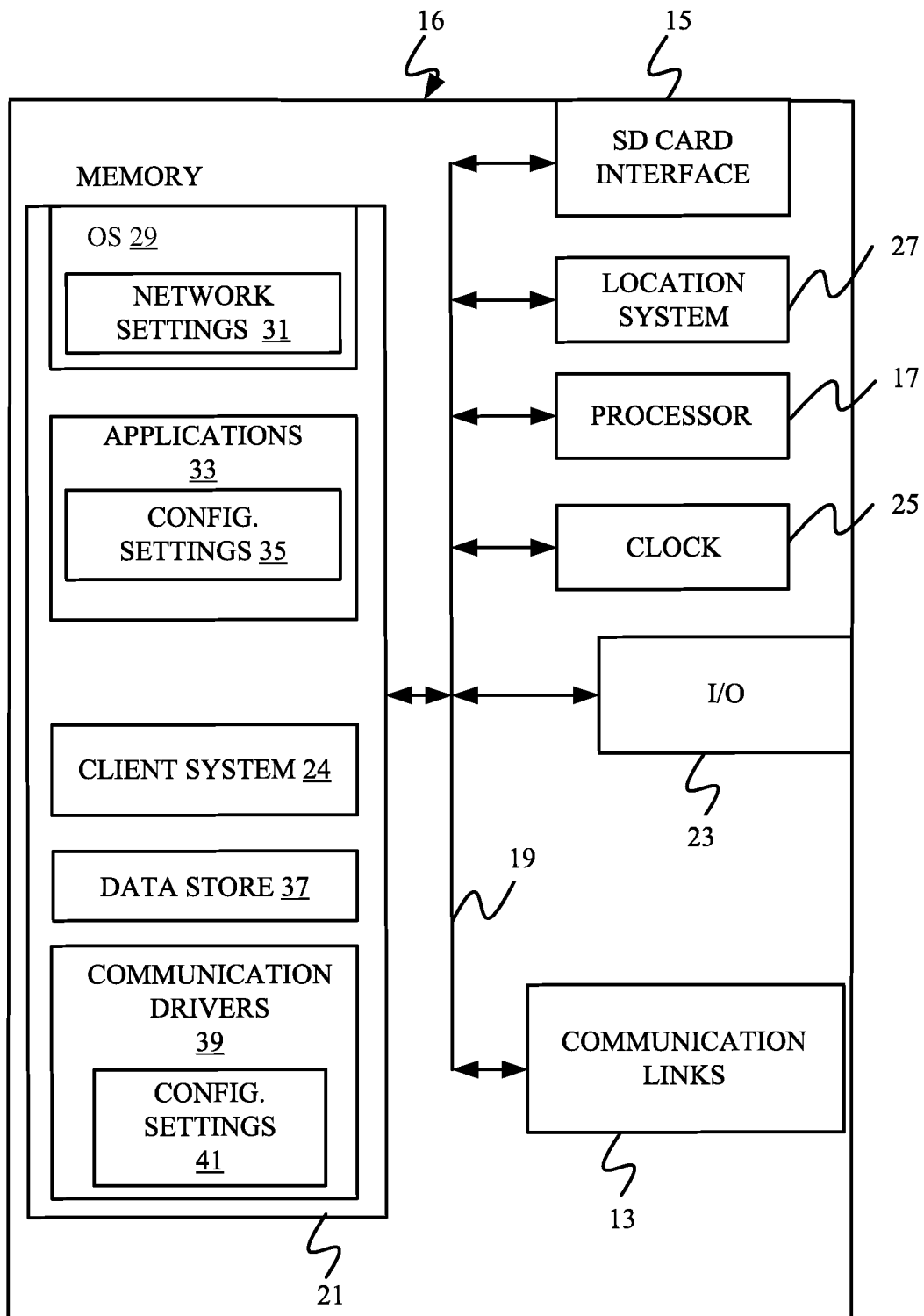
FIGS. 11-13 show examples of mobile devices that can be used in the architectures shown in the previous figures.
Figure 12:
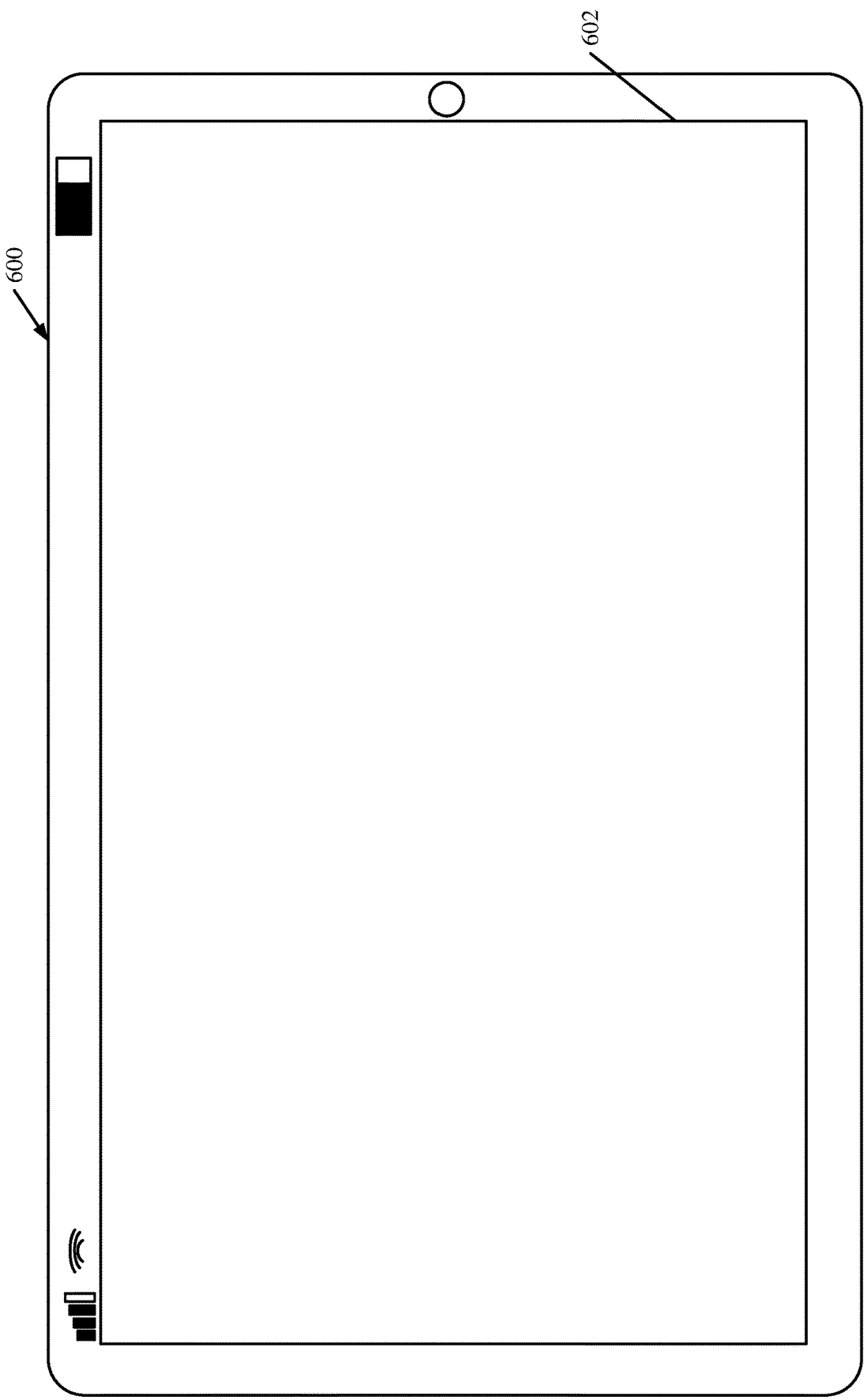
Figure 13:
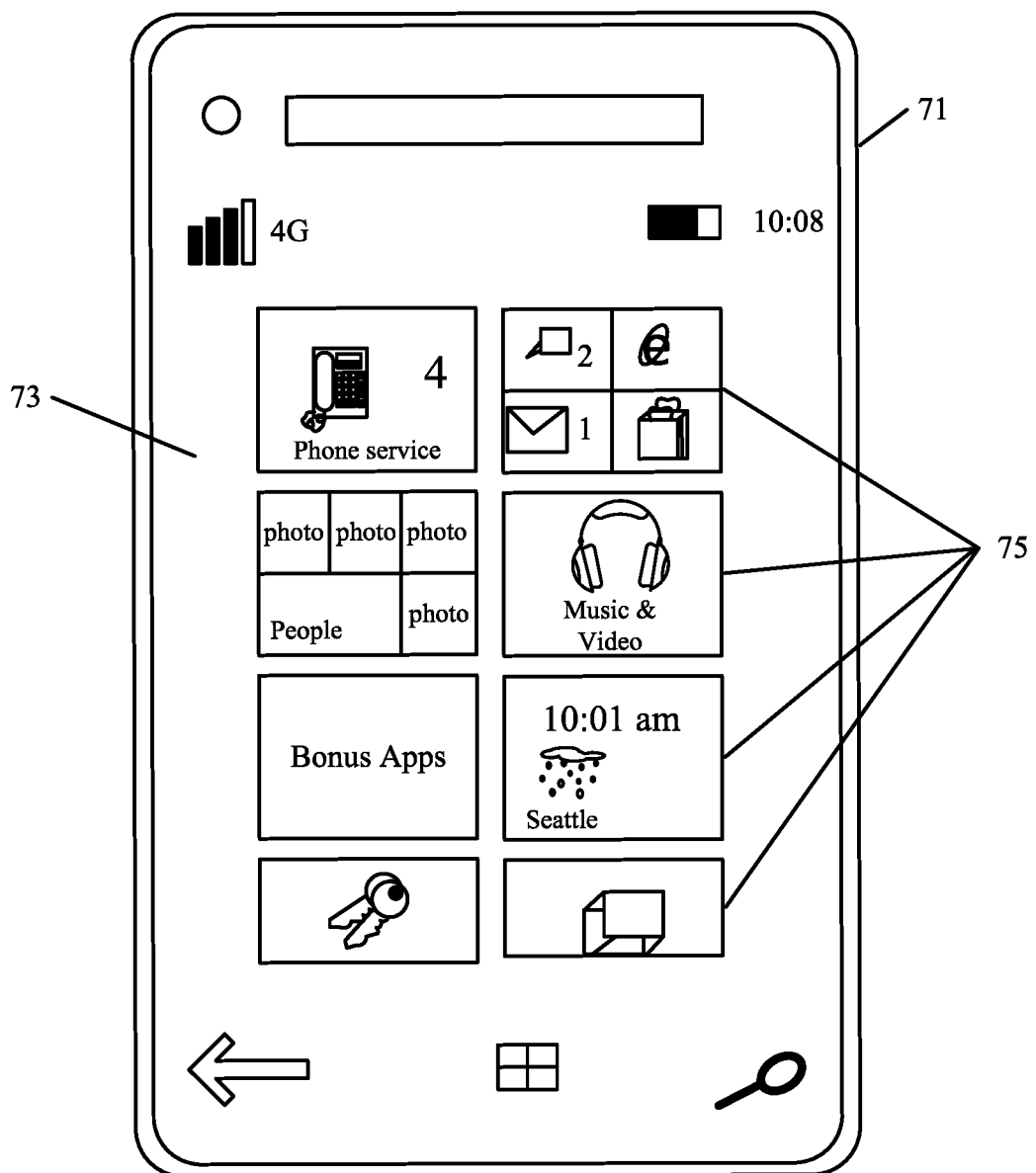

FIG. 11 is a simplified block diagram of one illustrative example of a handheld or mobile computing device that can be used as a user's or client's hand held device 16, in which the present system (or parts of it) can be deployed. For instance, a mobile device can be deployed in the operator compartment of agricultural machine 202 or as remote system 214. FIGS. 12-13 are examples of handheld or mobile devices.

FIG. 11 provides a general block diagram of the components of a client device 16 that can run some components shown in FIG. 4, that interacts with them, or both. In the device 16, a communications link 13 is provided that allows the handheld device to communicate with other computing devices and under some embodiments provides a channel for receiving information automatically, such as by scanning Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors or servers from previous FIGS.) along a bus 19 that is also connected to memory 21 and input/output (I/O) components 23, as well as clock 25 and location system 27.

I/O components 23, in one example, are provided to facilitate input and output operations. I/O components 23 for various embodiments of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 12 shows one example in which device 16 is a tablet computer 600. In FIG. 12, computer 600 is shown with user interface display screen 602. Screen 602 can be a touch screen or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 13 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 14:
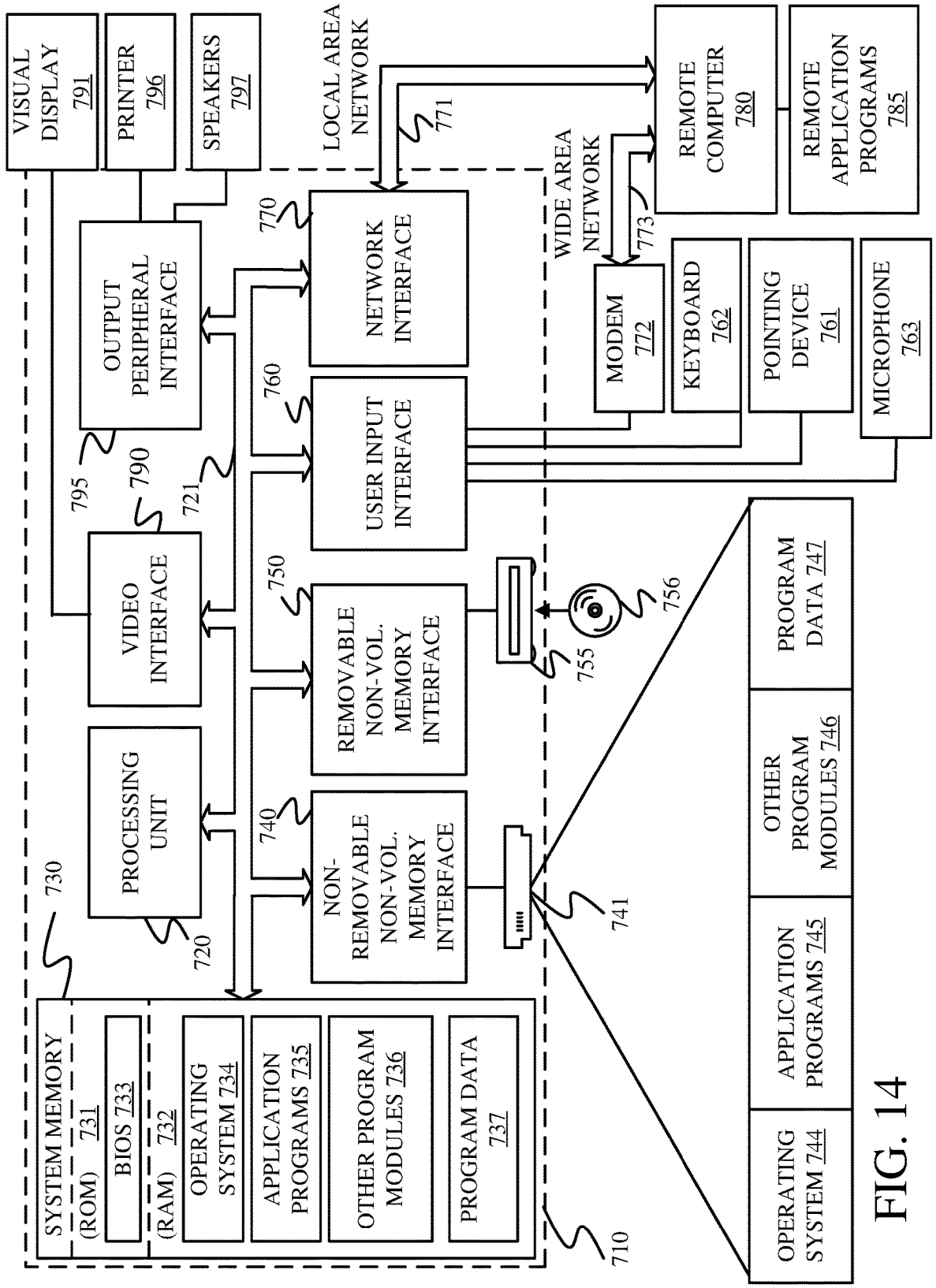
FIG. 14 is a block diagram showing one example of a computing environment that can be used in the architectures shown in the previous figures.

FIG. 14 is one example of a computing environment in which elements of FIG. 4, or parts of it, (for example) can be deployed. With reference to FIG. 14, an example system for implementing some embodiments includes a computing device in the form of a computer 710. Components of computer 710 may include, but are not limited to, a processing unit 720 (which can comprise processors or servers from previous FIGS.), a system memory 730, and a system bus 721 that couples various system components including the system memory to the processing unit 720. The system bus 721 may be any of several types of bus structures including a memory bus or memory controller, a peripheral bus, and a local bus using any of a variety of bus architectures. Memory and programs described with respect to FIG. 4 can be deployed in corresponding portions of FIG. 14.

Computer 710 typically includes a variety of computer readable media. Computer readable media can be any available media that can be accessed by computer 710 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 710. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 730 includes computer storage media in the form of volatile and/or nonvolatile memory such as read only memory (ROM) 731 and random access memory (RAM) 732. A basic input/output system 733 (BIOS), containing the basic routines that help to transfer information between elements within computer 710, such as during start-up, is typically stored in ROM 731. RAM 732 typically contains data and/or program modules that are immediately accessible to and/or presently being operated on by processing unit 720. By way of example, and not limitation, FIG. 14 illustrates operating system 734, application programs 735, other program modules 736, and program data 737.

The computer 710 may also include other removable/non-removable volatile/nonvolatile computer storage media. By way of example only, FIG. 14 illustrates a hard disk drive 741 that reads from or writes to non-removable, nonvolatile magnetic media, an optical disk drive 755, and nonvolatile optical disk 756. The hard disk drive 741 is typically connected to the system bus 721 through a non-removable memory interface such as interface 740, and optical disk drive 755 is typically connected to the system bus 721 by a removable memory interface, such as interface 750.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 14, provide storage of computer readable instructions, data structures, program modules and other data for the computer 710. In FIG. 14, for example, hard disk drive 741 is illustrated as storing operating system 744, application programs 745, other program modules 746, and program data 747. Note that these components can either be the same as or different from operating system 734, application programs 735, other program modules 736, and program data 737.

A user may enter commands and information into the computer 710 through input devices such as a keyboard 762, a microphone 763, and a pointing device 761, such as a mouse, trackball or touch pad. Other input devices (not shown) may include a joystick, game pad, satellite dish, scanner, or the like. These and other input devices are often connected to the processing unit 720 through a user input interface 760 that is coupled to the system bus, but may be connected by other interface and bus structures. A visual display 791 or other type of display device is also connected to the system bus 721 via an interface, such as a video interface 790. In addition to the monitor, computers may also include other peripheral output devices such as speakers 797 and printer 796, which may be connected through an output peripheral interface 795.

The computer 710 is operated in a networked environment using logical connections (such as a local area network—LAN, or wide area network—WAN or a controller area network—CAN) to one or more remote computers, such as a remote computer 780.

When used in a LAN networking environment, the computer 710 is connected to the LAN 771 through a network interface or adapter 770. When used in a WAN networking environment, the computer 710 typically includes a modem 772 or other means for establishing communications over the WAN 773, such as the Internet. In a networked environment, program modules may be stored in a remote memory storage device. FIG. 14 illustrates, for example, that remote application programs 785 can reside on remote computer 780.

It should also be noted that the different examples described herein can be combined in different ways. That is, parts of one or more examples can be combined with parts of one or more other examples. All of this is contemplated herein.

Example 1 is an agricultural sprayer comprising:
a spray boom supported by a frame;
a spraying system comprising a set of spray nozzles spaced along the spray boom; and
a control system configured to:
control the spraying system to spray a liquid based on a target application to an agricultural field;
generate a spray performance metric indicative of performance of the spraying system relative to the target application; and
generate a control signal to control the agricultural sprayer based on the spray performance metric.

Example 2 is the agricultural sprayer of any or all previous examples, wherein the target application comprises at least one of a target dispersal area or a target volume.

Example 3 is the agricultural sprayer of any or all previous examples, wherein the control system is configured to:
determine, based on a comparison of the spray performance metric to a spray performance metric threshold, a target velocity of the agricultural sprayer on the agricultural field.

Example 4 is the agricultural sprayer of any or all previous examples, and further comprising:
user interface logic configured to generate a user interface with a target performance user input mechanism; and
generate the spray performance metric threshold based on user actuation of the target performance user input mechanism.

Example 5 is the agricultural sprayer of any or all previous examples, wherein the control signal automatically controls a velocity of the agricultural sprayer based on the target velocity.

Example 6 is the agricultural sprayer of any or all previous examples, wherein the control signal controls a display device to render an indication of the target velocity.

Example 7 is the agricultural sprayer of any or all previous examples, wherein the control system is configured to generate the spray performance metric based on a sensor signal received from a sensor associated with the agricultural sprayer.

Example 8 is the agricultural sprayer of any or all previous examples, wherein the sensor signal is indicative of movement of the spray boom that changes a distance of the set of nozzles to the agricultural field.

Example 9 is the agricultural sprayer of any or all previous examples, wherein the sensor signal is indicative of spray boom vibration.

Example 10 is the agricultural sprayer of any or all previous examples,
wherein the sensor comprises an imaging sensor configured to obtain an image indicative of the spray emitted from one or more of the nozzles.

Example 11 is the agricultural sprayer of any or all previous examples,
wherein the control signal controls a display device to render an indication of the spray performance metric.

Example 12 is the agricultural sprayer of any or all previous examples, wherein the control system is configured to:
receive an indication of a source of machine disturbance in a path of the agricultural sprayer on the agricultural field; and
generate the spray performance metric based on the indication.

Example 13 is the agricultural sprayer of any or all previous examples, wherein the indication is based on a terrain map that identifies a topology of the agricultural field.

Example 14 is the agricultural sprayer of any or all previous examples,
wherein the indication is based on an image of the agricultural field obtained from an imaging sensor.

Example 15 is the agricultural sprayer of any or all previous examples, wherein the indication is based on historical field data representing a prior machine disturbance detected at a particular area of the agricultural field.

Example 16 is a method performed by an agricultural machine, the method comprising:
controlling a spraying system comprising a set of spray nozzles mounted on a spray boom of the agricultural machine to spray a liquid based on a target application to an agricultural field;
generating a spray performance metric indicative of performance of the spraying system relative to the target application; and
generating a control signal to control the agricultural machine based on the spray performance metric.

Example 17 is the method of any or all previous examples, and further comprising:
determining, based on a comparison of the spray performance metric to a spray performance metric threshold, a target velocity of the agricultural machine on the agricultural field.

Example 18 is the method of any or all previous examples, wherein the control signal controls a propulsion system associated with the agricultural machine based on the target velocity.

Example 19 is the method of any or all previous examples, and further comprising:
receiving an indication of a source of machine disturbance in a path of the agricultural machine on the agricultural field; and
generating the spray performance metric based on the indication.

Example 20 is an agricultural spraying machine comprising:
a spray boom supported by a frame;
a spraying system comprising a set of spray nozzles spaced along the spray boom; and
a control system configured to:
control the spraying system to spray a liquid based on a target application to an agricultural field;
generate a spray performance metric indicative of performance of the spraying system relative to the target application;
determine, based on a comparison of the spray performance metric to a spray performance metric threshold, a target velocity of the agricultural sprayer on the agricultural field; and
generate a control signal to control the agricultural sprayer based on the target velocity.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An agricultural sprayer comprising:
a spray boom supported by a frame;
a spraying system comprising a set of spray nozzles spaced along the spray boom;
a boom movement sensor configured to generate a sensor signal indicative of movement of the spray boom in a direction that is perpendicular to a travel direction of the agricultural sprayer; and
a control system configured to:
control the spraying system to spray a liquid based on a target application to an agricultural field;
receive an indication of a source of machine disturbance in a path of the agricultural sprayer on the agricultural field, wherein the source of machine disturbance represents predicted movement of the spray boom in the direction that is perpendicular to the travel direction of the agricultural sprayer;
generate a spray performance metric based on the indication of the source of machine disturbance and the sensor signal indicative of movement of the spray boom, wherein the spray performance metric is indicative of performance of the spraying system relative to the target application;
automatically determine a target travel speed for the agricultural sprayer on the agricultural field based on a comparison of the spray performance metric to a spray performance metric threshold; and
generate a control signal to control the agricultural sprayer based on the target travel speed.

2. The agricultural sprayer of claim 1, wherein the target application comprises a target dispersal area.

3. The agricultural sprayer of claim 1, wherein the target application comprises a target volume.

4. The agricultural sprayer of claim 1, and further comprising:
user interface logic configured to generate a user interface with a target performance user input mechanism; and
generate the spray performance metric threshold based on user actuation of the target performance user input mechanism.

5. The agricultural sprayer of claim 1, wherein the control signal automatically controls a speed of the agricultural sprayer based on the target travel speed.

6. The agricultural sprayer of claim 1, wherein the control signal controls a display device to render an indication of the target travel speed.

7. The agricultural sprayer of claim 1, wherein the movement of the spray boom comprises movement that changes a distance of the set of nozzles to the agricultural field, and the boom movement sensor comprises one or more of:
an accelerometer, a gyroscope, or an inertial measurement unit (IMU).

8. The agricultural sprayer of claim 1, wherein the spray performance metric threshold comprises a threshold movement of the spray boom.

9. The agricultural sprayer of claim 1, wherein the machine disturbance comprises spray boom vibration.

10. The agricultural sprayer of claim 1, and further comprising an imaging sensor configured to obtain an image indicative of the spray emitted from one or more of the spray nozzles.

11. The agricultural sprayer of claim 1, wherein the control signal controls a display device to render an indication of the spray performance metric.

12. The agricultural sprayer of claim 1, wherein the direction comprises a vertical direction toward or away from the agricultural field.

13. The agricultural sprayer of claim 1, wherein the indication is based on a terrain map that identifies a topology of the agricultural field.

14. The agricultural sprayer of claim 1, wherein the indication is based on an image of the agricultural field obtained from an imaging sensor.

15. The agricultural sprayer of claim 1, wherein the indication is based on historical field data representing a prior machine disturbance detected at a particular area of the agricultural field.

16. An agricultural spraying machine comprising:
a spray boom supported by a frame;
a spraying system comprising a set of spray nozzles spaced along the spray boom; and
a control system configured to:
control the spraying system to spray a liquid based on a target application to an agricultural field;
receive an indication of a source of machine disturbance in a path of the agricultural spraying machine on the agricultural field, wherein the source of machine disturbance represents predicted movement of the spray boom in a vertical direction that is perpendicular to a travel direction of the agricultural spraying machine;
generate a spray performance metric based on the indication of the source of machine disturbance in the path of the agricultural spraying machine on the agricultural field and a sensor signal indicative of movement of the spray boom, wherein the spray performance metric is indicative of performance of the spraying system relative to the target application;
determine, based on a comparison of the spray performance metric to a spray performance metric threshold, a target velocity of the agricultural spraying machine on the agricultural field; and
generate a control signal to control the agricultural spraying machine based on the target velocity.

17. The agricultural sprayer of claim 1, wherein the control system configured to:
identify a target increase in the spray performance metric; and
determine the target travel speed to achieve the target increase in the spray performance metric.

18. The agricultural sprayer of claim 17, wherein the control system configured to:
determine a target performance range corresponding to the spray performance metric; and
automatically determine the target travel speed based on the target performance range.

19. A method of controlling an agricultural sprayer, the method comprising:
controlling a spraying system to spray a liquid based on a target application to an agricultural field;
receiving an indication of a source of machine disturbance in a path of the agricultural sprayer on the agricultural field, wherein the source of machine disturbance represents predicted movement of a spray boom in a direction that is perpendicular to a travel direction of the agricultural sprayer;
generating a spray performance metric based on the indication of the source of machine disturbance in the path of the agricultural sprayer on the agricultural field and a sensor signal indicative of movement of the spray boom, wherein the spray performance metric is indicative of performance of the spraying system relative to the target application;
automatically determining a target travel speed for the agricultural sprayer on the agricultural field based on a comparison of the spray performance metric to a spray performance metric threshold; and
generating a control signal to control the agricultural sprayer based on the target travel speed.

20. The method of claim 19, wherein generating the control signal comprises automatically controlling a speed of the agricultural sprayer based on the target speed.

* * * * *